United States Patent
Cho

(10) Patent No.: US 11,417,215 B2
(45) Date of Patent: Aug. 16, 2022

(54) METHOD AND SYSTEM FOR TRACKING POSITION OF VEHICLE USING ULTRASONIC SENSOR IN REAR-CROSS BLIND SPOT

(71) Applicant: MANDO MOBILITY SOLUTIONS CORPORATION, Pyeongtaek-si (KR)

(72) Inventor: Seunghoon Cho, Seongnam-si (KR)

(73) Assignee: MANDO MOBILITY SOLUTIONS CORPORATION, Pyeongtaek-si (KR)

( * ) Notice: Subject to any disclaimer, the term of this patent is extended or adjusted under 35 U.S.C. 154(b) by 245 days.

(21) Appl. No.: 16/595,935

(22) Filed: Oct. 8, 2019

(65) Prior Publication Data
US 2020/0111369 A1 Apr. 9, 2020

(30) Foreign Application Priority Data
Oct. 8, 2018 (KR) .......................... 10-2018-0120046

(51) Int. Cl.
| | |
|---|---|
| *G08G 1/16* | (2006.01) |
| *G01S 13/93* | (2020.01) |
| *G01S 15/93* | (2020.01) |
| *G01S 17/02* | (2020.01) |
| *G01S 13/931* | (2020.01) |
| *G01S 15/931* | (2020.01) |
| *G01S 17/86* | (2020.01) |
| *B60Q 9/00* | (2006.01) |

(52) U.S. Cl.
CPC ............ *G08G 1/167* (2013.01); *G01S 13/931* (2013.01); *G01S 15/931* (2013.01); *G01S 17/86* (2020.01); *B60Q 9/008* (2013.01); *G01S 2013/9315* (2020.01); *G01S 2015/938* (2013.01)

(58) Field of Classification Search
CPC ....... G08G 1/167; G01S 17/86; G01S 13/931; G01S 15/931
See application file for complete search history.

(56) References Cited

U.S. PATENT DOCUMENTS

| | | | | |
|---|---|---|---|---|
| 2010/0049393 A1* | 2/2010 | Emam | .................... | G08G 1/161 701/31.4 |
| 2013/0010117 A1* | 1/2013 | Miyoshi | .................. | B60R 1/002 348/148 |

(Continued)

FOREIGN PATENT DOCUMENTS

| | | |
|---|---|---|
| JP | 5120139 B2 | 1/2013 |
| KR | 2000-0041233 A | 7/2000 |
| KR | 10-1410109 B1 | 6/2014 |

*Primary Examiner* — Peter D Nolan
*Assistant Examiner* — Demetra R Smith-Stewart
(74) *Attorney, Agent, or Firm* — Hauptman Ham, LLP

(57) ABSTRACT

The present disclosure relates to a method of more accurately tracking a tracking-target vehicle entering or exiting a dangerous area in a blind spot using ultrasonic sensors disposed on the front and rear portions of a subject vehicle. According to the present disclosure, it is possible to distinguish the case in which a tracking-target vehicle in a blind spot passes a subject vehicle from the case in which the subject vehicle passes the tracking-target vehicle, and it is also possible to effectively determine, in each of the cases, the point of time at which the tracking-target vehicle enters a dangerous area in the blind spot and the point of time at which the tracking-target vehicle exits the dangerous area.

18 Claims, 15 Drawing Sheets

(56) References Cited

U.S. PATENT DOCUMENTS

| | | | |
|---|---|---|---|
| 2014/0188365 A1* | 7/2014 | Nagata | B60W 30/143 |
| | | | 701/93 |
| 2014/0288814 A1* | 9/2014 | Schoenherr | G01S 15/931 |
| | | | 701/301 |
| 2015/0185319 A1* | 7/2015 | Matsuura | G08G 1/167 |
| | | | 73/627 |
| 2015/0350607 A1* | 12/2015 | Kim | H04N 7/181 |
| | | | 348/148 |
| 2016/0193998 A1* | 7/2016 | Yellambalase | B60W 50/14 |
| | | | 348/148 |
| 2016/0196748 A1* | 7/2016 | Yellambalase | G06K 9/00798 |
| | | | 340/435 |

\* cited by examiner

METHOD AND SYSTEM FOR TRACKING POSITION OF VEHICLE USING ULTRASONIC SENSOR IN REAR-CROSS BLIND SPOT

CROSS REFERENCE TO RELATED APPLICATION

This application claims priority from Korean Patent Application No. 10-2018-0120046, filed on Oct. 8, 2018, which is hereby incorporated by reference for all purposes as if fully set forth herein.

BACKGROUND OF THE INVENTION

1. Field of the Invention

The present disclosure relates to a method and system that distinguishes the case in which a tracking-target vehicle in a blind spot passes a subject vehicle from the case in which the subject vehicle passes the tracking-target vehicle and that effectively determines, in each of the cases, the point of time at which the tracking-target vehicle enters a dangerous area in the blind spot and the point of time at which the tracking-target vehicle exits the dangerous area.

2. Description of the Prior Art

In general, vehicles have side mirrors for seeing following vehicles or changing lanes, but the side mirrors have a blind spot that drivers cannot see due to the height of the drivers' eyes, or the sizes of the mirrors etc. Ultrasonic sensors, radars, and cameras were used in the related art to sense obstacles etc. that may exist in blind spots. In particular, a system that prevents difficult in driving due to obstacles in blind spots is a back warning system known as a BSD (Blind Spot Detection) system and uses a radar sensor etc. to detect the position of tracking-target vehicles in blind spots at the rear and side areas from a driver.

However, the BSD system can somewhat measure a side distance when a tracking-target vehicle is positioned behind a side of the subject vehicle, but has difficulty in accurately determining the position of a vehicle driven ahead of or behind the subject vehicle or the course of the tracking-target vehicle. In order to solve this problem, a system that includes a plurality of radar sensors or ultrasonic sensors mounted on a vehicle, including the sides of the vehicle, and senses approaching objects using the sensors has been proposed in the related art.

However, attaching several sensors on sides to sense approaching objects increases the manufacturing cost of a vehicle, so it cannot be considered an effective method of detecting objects in blind spots. In particular, the cases of driving vehicles can be classified into the case in which a subject vehicle passes a tracking-target vehicle and the case in which a tracking-target vehicle passes a subject vehicle, so it is required to examine a reference for effectively detecting the position of the tracking-target vehicle in a blind spot in consideration of both cases.

SUMMARY OF THE INVENTION

In this background, an aspect of the present disclosure is to provide a method and system that can more accurately track the positions of the front and rear portions of a tracking-target vehicle in a blind spot using ultrasonic sensors disposed on the front and rear portions of a subject vehicle.

Further, the present disclosure provides a method and system that distinguish the case in which a tracking-target vehicle in a blind spot passes a subject vehicle from the case in which the subject vehicle passes the tracking-target vehicle and that effectively determine the point of time at which the tracking-target vehicle enters a dangerous area in the blind spot and the point of time at which the tracking-target vehicle exits the dangerous area.

In accordance with an aspect of the present disclosure, there is provided a method of tracking the position of an outside tracking-target vehicle from a subject vehicle including a rear-cross radar sensor, which is composed of at least one of a radar, a lidar, and a camera, a front ultrasonic sensor, and a rear ultrasonic sensor, the method including: comparing a measured distance to the tracking-target vehicle by the front ultrasonic sensor and a measured distance to the tracking-target vehicle by the rear ultrasonic sensor; and determining whether the tracking-target vehicle enters or exits a dangerous area in a rear-cross blind spot of the subject vehicle using a result of the comparing, in which whether the tracking-target vehicle enters or exits the dangerous area is determined for each of passive passing in which the tracking-target vehicle passes the subject vehicle and active passing in which the subject vehicle passes the tracking-target vehicle.

In accordance with another aspect of the present disclosure, there is provided a method of tracking the position of a tracking-target vehicle from a subject vehicle including a rear-cross radar sensor, which is composed of at least one of a radar, a lidar, and a camera, a front ultrasonic sensor, and a rear ultrasonic sensor in passive passing in which the tracking-target vehicle passes the subject vehicle, the method including: tracking the tracking-target vehicle in a rear-cross sensor area using the rear-cross sensor; comparing a measured distance to the tracking-target vehicle by the front ultrasonic sensor and a measured distance to the tracking-target vehicle by the rear ultrasonic sensor; calculating the position of a specific portion of the tracking-target vehicle while the measured distance to the tracking-target vehicle by the rear ultrasonic sensor increases with the measured distance to the tracking-target vehicle by the front ultrasonic sensor maintained at a constant level; and determining whether the tracking-target vehicle exits a dangerous area in a rear-cross blind spot of the subject vehicle, in which whether the tracking-target vehicle exits the dangerous area is determined on the basis of whether the position of the specific portion of the tracking-target vehicle exits a reference position.

In accordance with another aspect of the present disclosure, there is provided a method of tracking the position of a tracking-target vehicle from a subject vehicle including a rear-cross radar sensor, which is composed of at least one of a radar, a lidar, and a camera, a front ultrasonic sensor, and a rear ultrasonic sensor in active passing in which the subject vehicle passes the tracking-target vehicle, the method including: comparing a measured distance to the tracking-target vehicle by the front ultrasonic sensor and a measured distance to the tracking-target vehicle by the rear ultrasonic sensor; calculating the position of a specific portion of the tracking-target vehicle while the measured distance to the tracking-target vehicle by the front ultrasonic sensor increases with the measured distance to the tracking-target vehicle by the rear ultrasonic sensor maintained at a constant level as the result of comparing the measured distance to the tracking-target vehicle by the front ultrasonic sensor and the measured distance to the tracking-target vehicle by the rear ultrasonic sensor; determining that the tracking-target vehicle enters the dangerous area when the position of the specific portion of the tracking-target vehicle enters a reference position; and tracking the tracking-target vehicle in a rear-cross sensor area using the rear-cross sensor.

In accordance with another aspect of the present disclosure, there is provided a system for tracking a vehicle, the system including: a rear-cross sensor disposed on the rear portion of a subject vehicle and composed of at least one of a radar, a lidar, and a camera; a front ultrasonic sensor disposed on the front portion of the subject vehicle; a rear ultrasonic sensor disposed on the rear portion of the subject vehicle; a controller configured to compare a measured distance to a tracking-target vehicle by the front ultrasonic sensor and a measured distance to the tracking-target vehicle by the rear ultrasonic sensor, and determine whether the tracking-target device enters or exits a dangerous area of a rear-cross blind spot of the subject vehicle, using a result of the comparing; and a display configured to display entry of exit to a driver when the tracking-target vehicle enters or exits the dangerous area as the result of determining by the controller.

As described above, according to the present disclosure, it is possible to provide a method of more accurately tracking a tracking-target vehicle entering or exiting a dangerous area in a blind spot using ultrasonic sensors disposed on the front and rear portions of a subject vehicle.

Further, according to the present disclosure, it is possible to provide a method and system that discriminates a case in which a tracking-target vehicle in a blind spot passes a subject vehicle and a case in which the subject vehicle passes the tracking-target vehicle and that effectively determines a point of time when the tracking-target vehicle enters a dangerous area in the blind spot and a point of time when the tracking-target vehicle exits the dangerous area.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described in detail with reference to the accompanying drawings. In the description of the elements of the present disclosure, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
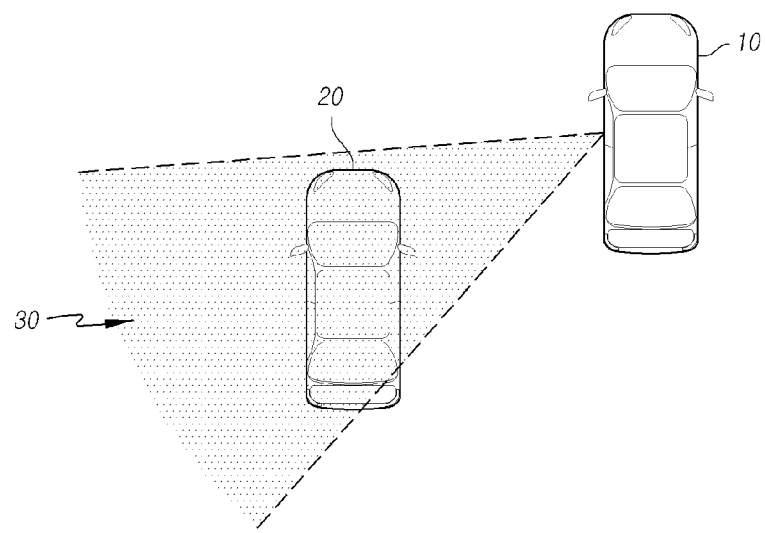
FIG. 1 is a view showing a blind spot of a driver that is caused by a side mirror.

FIG. 1 is a view showing a blind spot of a driver that is caused by a side mirror. The blind spot 30 is generally the area between 13° and 45° from a side of a vehicle. The dead zone that a driver cannot see and that falls outside the range of a side mirror is generally called a blind spot and areas that drivers cannot see are collectively referred as blind spots in the present disclosure. Such blind spots may include the left- or right-rear area relative to a driver.

Accordingly, when a tracking-target vehicle 20 in a rear-cross area enters a blind spot of a subject vehicle 10, the driver of the subject vehicle 10 has difficulty visually checking the tracking-target vehicle 20 through a side mirror, so he/she may feel difficulty in driving.

Figure 2:
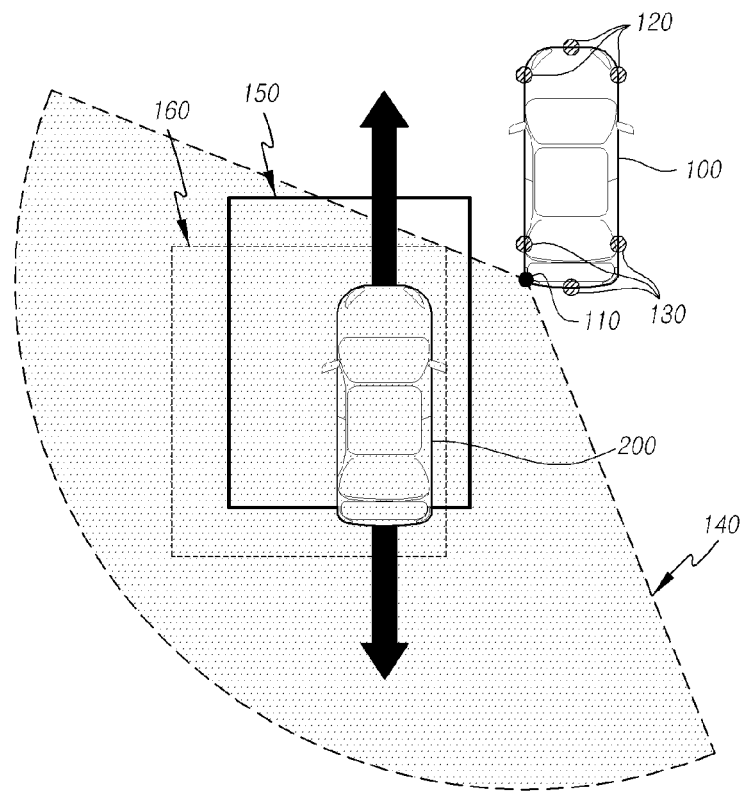
FIG. 2 is a view showing the concept of a method of tracking the position of a vehicle in a rear-side blind spot using an ultrasonic sensor according to an embodiment.

FIG. 2 is a view showing the concept of a method of tracking the position of a vehicle in a rear-cross blind spot using an ultrasonic sensor according to an embodiment.

Referring to FIG. 2, a method of tracking the position of a vehicle in a rear-cross blind spot using an ultrasonic sensor of the present disclosure tracks the position of a tracking-target vehicle 200 separately in the case in which a tracking-target vehicle 200 in a rear-cross blind spot of a subject vehicle 100 passes the subject vehicle 100 and the case in which a forward tracking-target vehicle 200 enters the rear-cross blind spot due to the subject vehicle 100 passing the tracking-target vehicle 200.

The case in which a tracking-target vehicle 200 in a rear-cross blind spot of a subject vehicle 100 passes the subject vehicle 100 is referred to as passive passing and the case in which the subject vehicle 100 passes a forward tracking-target vehicle 200 is referred to as active passing. The tracking-target vehicle 200 approaches the subject vehicle 100 from the rear area in passive passing and the tracking-target vehicle 200 approaches the subject vehicle 100 from the front area in active passing. That is, a hysteresis period that differently determines the point of time at which the tracking-target vehicle 200 enters or exits the rear blind spot may be set in the passive passing and the active passing.

Accordingly, it is preferable to differently set a dangerous area where the tracking-target vehicle 200 may make it difficult to drive the subject vehicle 100 in the blind spot in consideration of the movement direction of the tracking-target vehicle 200 in the cases. For example, it may be possible to set a passive passing-dangerous area 150 on the basis of the time at which the tracking-target vehicle 200 safely moves away from the subject vehicle 100 in the passive passing and an active passing-dangerous area 160 on the basis of the time at which the tracking-target vehicle 200 enters the rear blind spot from the front area of the subject vehicle 100 in the active passing. As shown in the figures, the passive passing-dangerous area 150 may be set ahead of the active passing-dangerous area 160. That is, the frontmost horizontal line of the passive passing-dangerous area 150 may be positioned ahead of the frontmost horizontal line of the active passing-dangerous area 160.

For the method of tracking the position of a vehicle in a rear-cross blind spot using an ultrasonic sensor of the present disclosure, the subject vehicle 100 may include a rear-across radar sensor 110, a front ultrasonic sensor 120, and a rear ultrasonic sensor 130.

The rear-cross radar sensor 110 is a device for sensing obstacles in the rear of the vehicle. A radar sensor mounted on the left rear side of the vehicle detects obstacles in the left rear area from the vehicle and a radar sensor mounted on the right rear side of the vehicle senses obstacles in the right rear area from the vehicle. The case in which the rear-cross radar sensor 110 is mounted on the left rear side of the vehicle is exemplified to describe the case in which the tracking-target vehicle 200 is located at the left side of the subject vehicle 100. As described above, the rear-cross radar sensor 110 mounted on the left rear side of the vehicle senses a rear-cross radar area 140 including the left rear side of the vehicle, particularly the blind spot.

For reference, as radars that are available for vehicles, a pulse radar, a bistatic radar, and a Frequency-Modulated Continuation Waveform (FMCW) radar etc. can be exemplified, and various waveforms can be used for these radar sensors. The pulse radar is a radar that uses pulses having a sufficiently wider gap than the pulse width, the bistatic radar is a radar in which a transmitter and a receiver maintain a predetermined distance therebetween using separate antennas, and the FMCW radar is a radar that senses the distance to an object by modulating a frequency. As for the FMCW radar, continuous signals of which the frequency changes are transmitted from the transmitter. In this case, the FMCW radar is also called a chirp radar system. A Continuous Wave (CW) signal showing the distance between the radar transmitter/receiver and a tracking-target vehicle can be produced by combining a waveform reflected by the tracking-target vehicle with a transmitted signal. The frequency of the CW signal is swept up and then decreased, whereby a Doppler frequency is determined.

The front ultrasonic sensor 120 is a sensor that senses obstacles in the left and right front area from the vehicle and the rear ultrasonic sensor 130 is a sensor that senses obstacles in the left and right rear area from the vehicle. A plurality of front ultrasonic sensors 120 and rear ultrasonic sensors 130 may be used, but the case in which three front ultrasonic sensors 120 and three rear ultrasonic sensors 130 are installed is described by way of example herein.

The method of tracking the position of a vehicle in a rear-cross blind spot using an ultrasonic sensor of the present disclosure will be described for each of passive passing and active passing.

Figure 3:
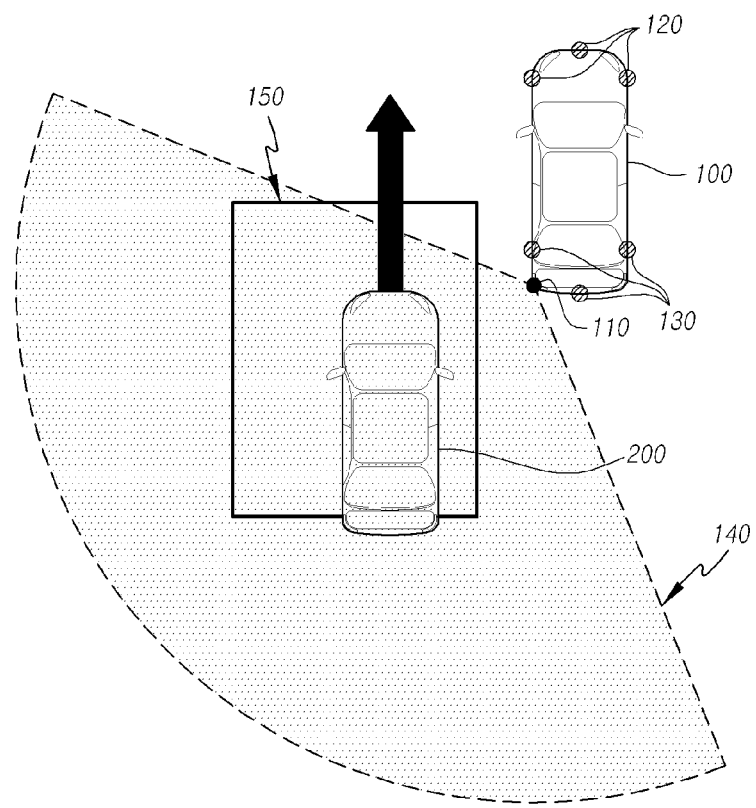
FIG. 3 is a view showing the concept of tracking the position of a tracking-target vehicle in a passive passing, in method of tracking the position of a vehicle in a rear-cross blind spot using an ultrasonic sensor according to the present disclosure.

FIG. 3 is a view showing the concept of tracking the position of a tracking-target vehicle in passive passing, in a method of tracking the position of a vehicle in a rear-cross blind spot using an ultrasonic sensor according to the present disclosure.

Referring to FIG. 3, in the passive passing, since the tracking-target vehicle 200 approaches from the rear area, the subject vehicle 100 can sense the approach of the tracking-target vehicle 200 through the rear-cross radar sensor 110. In particular, a radar sensor has a larger range than an ultrasonic sensor, so in the passive passing in which the tracking-target vehicle 200 approaches from the rear area, it is effective not only to sense the approach through the rear-cross radar sensor 110, but also to determine whether the tracking-target vehicle 200 enters the dangerous area 150 through the rear-cross radar sensor 110.

When the tracking-target vehicle 200 enters the dangerous area 150 in the passive passing, it is possible to track the position of the tracking-target vehicle 200 through the front ultrasonic sensor 120 and the rear ultrasonic sensor 130 on the subject vehicle 100. The position of the tracking-target vehicle 200 may include a horizontal position with respect to the subject vehicle 100 and the position in the up-down movement direction of the tracking-target vehicle 200. In particular, in order to precisely determine a case such as contact of the tracking-target vehicle 200 with the subject vehicle 100, it is required to accurately detect not only the horizontal position, but also the up-down position of the tracking-target vehicle 200.

The distance to the tracking-target vehicle 200 detected by the front ultrasonic sensor 120 and the rear ultrasonic sensor 130 has a characteristic that depends on how close the tracking-target vehicle 200 approaches the subject vehicle 100. This will be described in more detail below.

By detecting the position of the tracking-target vehicle 200 through the front ultrasonic sensor 120 and the rear ultrasonic sensor 130, it is possible to warn a driver of a danger of collision when the tracking-target vehicle 200 is in the dangerous area 150 and it is possible to shows that the tracking-target vehicle 200 has exited the dangerous area when the tracking-target vehicle 200 exits the dangerous area 150 and moves ahead of the subject vehicle 100.

Accordingly, in the passive passing, it is possible to determine whether the tracking-target vehicle 200 has entered the dangerous area 150 using the rear-cross radar sensor 110 and whether the tracking-target vehicle 200 has exited the dangerous area 150 using the ultrasonic sensors 120 and 130.

FIGS. 4 to 7 are views showing a process of determining whether a tracking-target vehicle exits a dangerous area on the basis of the position of the tracking-target vehicle in passive passing, in the method of tracking the position of a vehicle in a rear-cross blind spot using an ultrasonic sensor according to the present disclosure.

Figure 4:
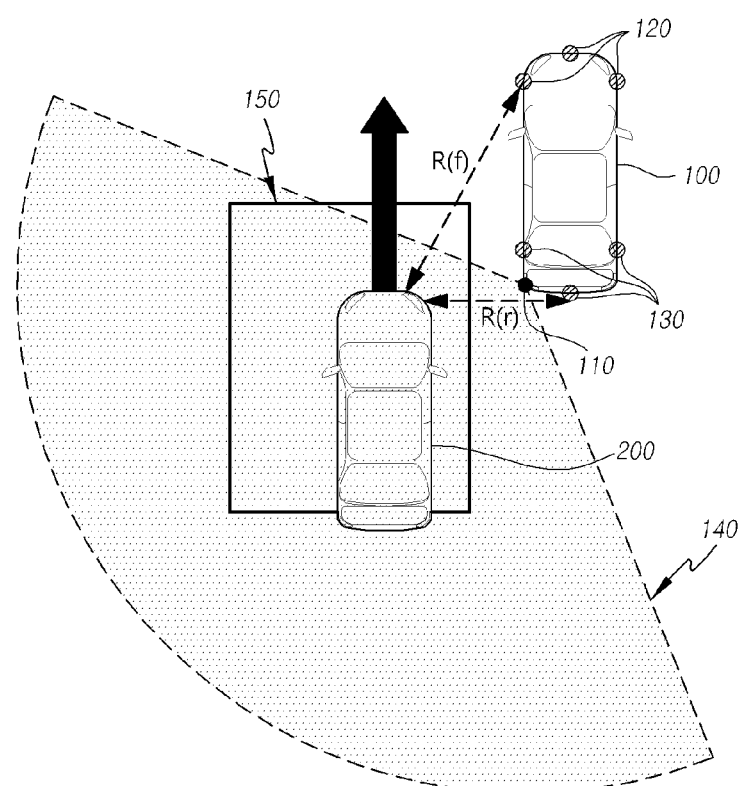
FIGS. 4 to 7 are views showing a process of determining whether a tracking-target vehicle exits a dangerous area on the basis of the position of the tracking-target vehicle in passive passing, in the method of tracking the position of a vehicle in a rear-cross blind spot using an ultrasonic sensor according to the present disclosure.

Referring to FIG. 4 first, the tracking-target vehicle 200 will approach the subject vehicle 100 from the rear area and then enter a blind spot at the left rear area from the subject vehicle 100. The tracking-target vehicle 200 is positioned in the rear-cross radar area 140, so the approach of the tracking-target vehicle 200 can be sensed through the rear-cross radar sensor 110 on the left rear side of the subject vehicle 100.

When the tracking-target vehicle 200 enters a preset dangerous area 150 or approaches within a predetermined distance from the subject vehicle 100, the rear ultrasonic sensor 130 on the subject vehicle 100 is operated first, thereby measuring the distance to the tracking-target vehicle 200. In this process, the measured distance R(r) to the tracking-target vehicle 200 by the rear ultrasonic sensor 130 will gradually decrease as the tracking-target vehicle 200 approaches the subject vehicle 100.

When the tracking-target vehicle 200 keeps approaching the subject vehicle 100 and the front bumper of the tracking-target vehicle 200 is positioned in the same line as the rear bumper of the subject vehicle 100, the sides of the tracking-target vehicle 200 will be parallel to the sides of the subject vehicle 100 and the measured distance R(r) to the tracking-target vehicle 200 by the rear ultrasonic sensor 130 will be the minimum. In this state, the front ultrasonic sensor 120 of the subject vehicle 100 is positioned diagonally from the tracking-target vehicle 200, so the measured distance R(f) to the tracking-target vehicle 200 by the front ultrasonic sensor 120 is not the minimum.

Figure 5:
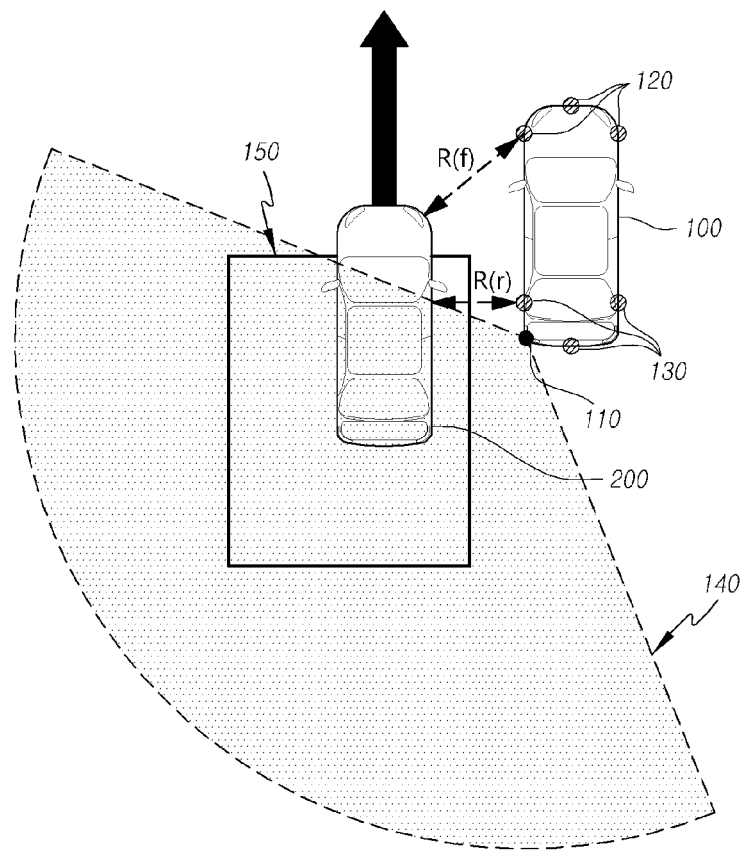

Thereafter, when the tracking-target vehicle 200 moves alongside the subject vehicle 100 at a higher speed than the subject vehicle 100, as shown in FIG. 5, the tracking-target vehicle 200 passes the subject vehicle 100 in parallel with the subject vehicle in the vertical direction.

In this process, the rear ultrasonic sensor 130 of the subject vehicle 100 measures the distance to a side of the tracking-target vehicle 200, so the measured distance R(r) to the tracking-target vehicle 200 by the rear ultrasonic sensor 130 will be maintained at a constant level until the rear bumper of the tracking-target vehicle 200 passes by the rear ultrasonic sensor 130. Obviously, the measured distance R(r) to the tracking-target vehicle 200 by the rear ultrasonic sensor 130 may be slightly changed by curves on the side or left-right movement of the tracking-target vehicle 200, but the changes may be limited within a predetermined range.

As the tracking-target vehicle 200 passes the subject vehicle 100, the measured distance R(f) to the tracking-target vehicle 200 by the front ultrasonic sensor 120 will gradually decrease.

Accordingly, in the period for which the measured distance R(f) to the tracking-target vehicle 200 by the front ultrasonic sensor 120 decreases with the measured distance R(r) to the tracking-target vehicle 200 by the rear ultrasonic sensor 130 maintained at a constant level, it is possible to determine that the tracking-target vehicle 200 is passing the subject vehicle 100 along a side of the subject vehicle 100.

Figure 6:
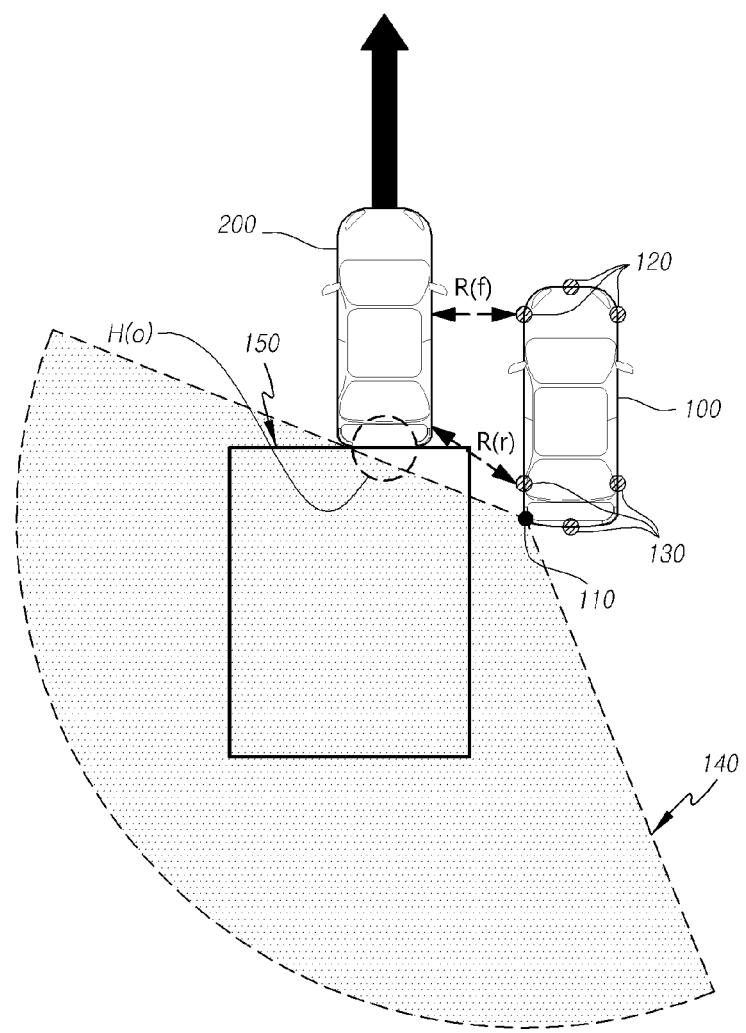

FIG. 6 shows a case in which the front bumper of the tracking-target vehicle 200 passes the front bumper of the subject vehicle 100. In this case, unlike the case of FIG. 5, the measured distance R(f) to the tracking-target vehicle 200 by the front ultrasonic sensor 120 is maintained at a constant level until the rear bumper of the tracking-target vehicle 200 passes by the front ultrasonic sensor 120. In contrast, as the tracking-target vehicle 200 passes the subject vehicle 100, the measured distance R(r) to the tracking-target vehicle 200 by the rear ultrasonic sensor 130 will gradually increase.

At the point of time at which the tracking-target vehicle 200 does not come into contact with the subject vehicle 100 or disturb driving of the subject vehicle 100 after sufficiently passing the subject vehicle 100, it is possible to determine that the tracking-target vehicle 200 has exited the dangerous area 150. Whether the tracking-target vehicle 200 perform-ing passive passing has exited the dangerous area 150 can be determined on the basis of various references; however, considering safety in driving, it is preferable to determine that it is the point of time H(o) of the tracking-target vehicle 200 exiting the dangerous area 150 when the rear bumper of the tracking-target vehicle 200 passes a reference position of the dangerous area 150. Preferably, the reference position for determining that the rear bumper of the tracking-target vehicle 200 exits the dangerous area 150 may be the frontmost horizontal line of the dangerous area 150.

Figure 7:
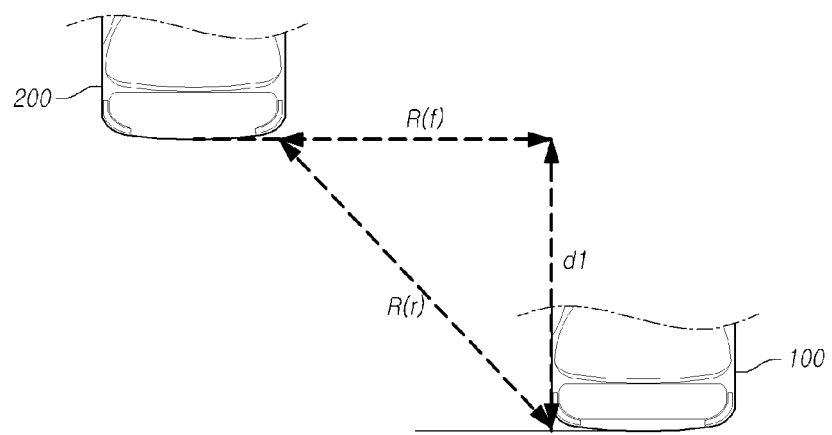

The horizontal position of the rear bumper of the tracking-target vehicle 200 can be calculated, as in FIG. 7. That is, the measured distance R(f) to the tracking-target vehicle 200 by the front ultrasonic sensor 120 is the horizontal distance between the tracking-target vehicle 200 and the subject vehicle 100 and the measured distance R(r) to the tracking-target vehicle 200 by the rear ultrasonic sensor 130 is the diagonal distance between the rear bumper of the tracking-target vehicle 200 to the rear bumper of the subject vehicle 100. Therefore, it is possible to calculate the vertical distance d1 between the rear bumper of the tracking-target vehicle 200 and the rear bumper of the subject vehicle 100 using the Pythagorean theorem. Accordingly, it is possible to determine the point of time at which the rear bumper of the tracking-target vehicle 200 passes the rear bumper of the subject vehicle 100 over a predetermined distance as the point of time H(o) of exiting the dangerous area 150. Preferably, an effective reference for determining that the rear bumper of the tracking-target vehicle 200 exits the dangerous area 150 may be the frontmost horizontal line of the dangerous area 150.

Figure 8:
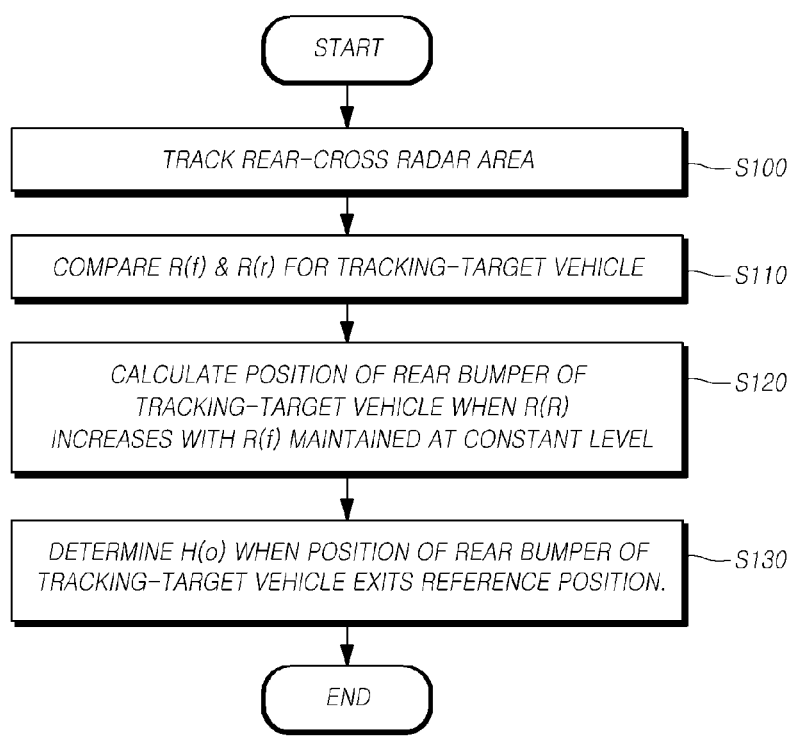
FIG. 8 is a flowchart showing the process of determining whether a tracking-target vehicle exits a dangerous area on the basis of the position of the tracking-target vehicle in passive passing, in the method of tracking the position of a vehicle in a rear-cross blind spot using an ultrasonic sensor according to the present disclosure.

FIG. 8 is a flowchart showing the process of determining whether a tracking-target vehicle exits a dangerous area on the basis of the position of the tracking-target vehicle in passive passing, in the method of tracking the position of a vehicle in a rear-cross blind spot using an ultrasonic sensor according to the present disclosure.

Referring to FIG. 8, the process of determining whether a tracking-target vehicle exits a dangerous area on the basis of the position of the tracking-target vehicle in passive passing may include: tracking a rear-cross radar area (S100); comparing the measured distance R(f) to the tracking-target vehicle 200 by the front ultrasonic sensor 120 and the measured distance R(r) to the tracking-target vehicle 200 by the rear ultrasonic sensor 130 (S110); calculating the position of the rear bumper of the tracking-target vehicle 200 when the measured distance R(r) to the tracking-target vehicle 200 by the rear ultrasonic sensor 130 increases with the measured distance R(f) to the tracking-target vehicle 200 by the front ultrasonic sensor 120 maintained at a constant level (S120); and determining that it is the point of time H(o) of exiting the dangerous area 150 when the rear bumper of the tracking-target vehicle 200 exits the reference position (S130).

The tracking of a rear-cross radar area (S100) is a process of tracking the tracking-target vehicle 200 approaching from the rear area, through the radar sensor 110 on the left or right rear side of the subject vehicle 100. When the tracking-target vehicle 200 entering the rear-cross radar area 140 or a blind spot is detected by the rear-cross radar sensor 110, the position of the tracking-target vehicle 200 is determined through the front ultrasonic sensor 120 and the rear ultrasonic sensor 130.

The comparing of the measured distance R(f) to the tracking-target vehicle 200 by the front ultrasonic sensor 120 and the measured distance R(r) to the tracking-target vehicle 200 by the rear ultrasonic sensor 130 (S110) is a process of detecting the position of the tracking-target vehicle 200 through the front ultrasonic sensor 120 and the rear ultrasonic sensor 130 and then determining the passing state of the tracking-target vehicle 200 on the basis of the measured distance R(f) to the tracking-target vehicle 200 by the front ultrasonic sensor 120 and the measured distance R(r) to the tracking-target vehicle 200 by the rear ultrasonic sensor 130. That is, when the tracking-target vehicle 200 approaches from far away in the rear area, both of the measured distance R(f) to the tracking-target vehicle 200 by the front ultrasonic sensor 120 and the measured distance R(r) to the tracking-target vehicle 200 by the rear ultrasonic sensor 130 will decrease. However, when the tracking-target vehicle 200 is close to a side of the subject vehicle 100, the measured distance R(r) to the tracking-target vehicle 200 by the rear ultrasonic sensor 130 will be maintained at a constant level and the measured distance R(f) to the tracking-target vehicle 200 by the front ultrasonic sensor 120 will decrease.

On the contrary, when the rear bumper of the tracking-target vehicle 200 passes the rear bumper of the subject vehicle 100, the measured distance R(f) to the tracking-target vehicle 200 by the front ultrasonic sensor 120 will be maintained at a constant level and the measured distance R(r) to the tracking-target vehicle 200 by the rear ultrasonic sensor 130 will increase. In this case, it is possible to determine whether the tracking-target vehicle 200 exits the dangerous area 150 on the basis of the position of the rear bumper of the tracking-target vehicle 200.

Accordingly, when the measured distance R(f) to the tracking-target vehicle 200 by the front ultrasonic sensor 120 is maintained at a constant level and the measured distance R(r) to the tracking-target vehicle 200 by the rear ultrasonic sensor 130 increases, and when the measured distance R(f) to the tracking-target vehicle 200 by the front ultrasonic sensor 120 is a horizontal distance and the measured distance R(r) to the tracking-target vehicle 200 by the rear ultrasonic sensor 130 is a diagonal distance, the calculating of the position of the rear bumper of the tracking-target vehicle 200 (S120) can calculate the vertical distance as the distance between the rear bumper of the tracking-target vehicle 200 and the rear bumper of the subject vehicle 100.

As a result, when the position of the rear bumper of the tracking-target vehicle 200 exits the reference position, it is possible to determine whether the tracking-target vehicle 200 has exited dangerous area 150 and is in a safe situation through the determining of that it is the point of time H(o) of exiting the dangerous area 150 (S130). The reference position may be the frontmost horizontal line of the dangerous area 150.

Active passing in which the subject vehicle 100 passes a forward tracking-target vehicle is described in detail hereafter.

Figure 9:
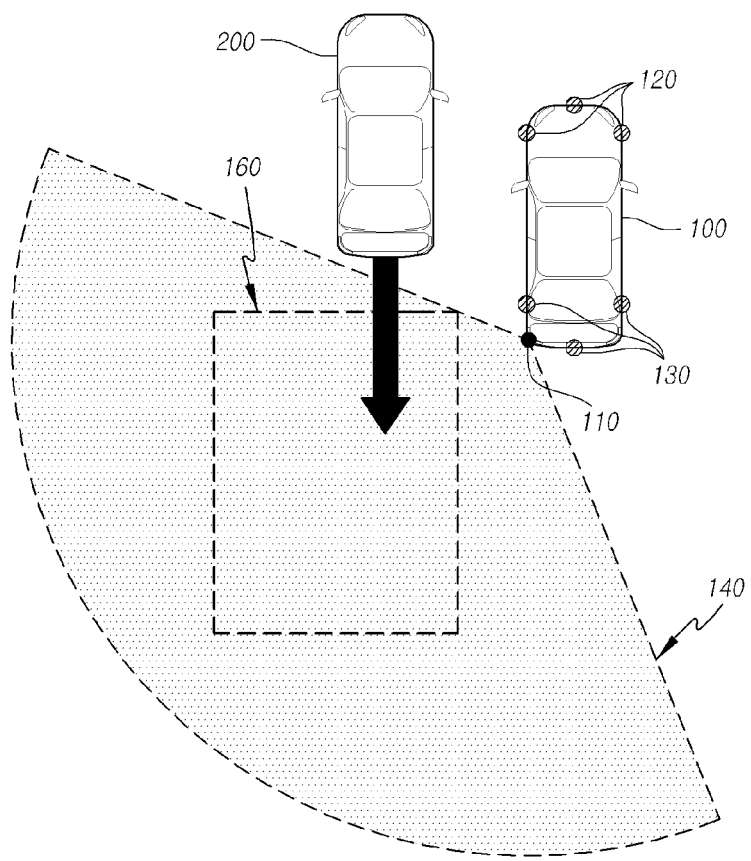
FIG. 9 is a view showing the concept of tracking the position of a tracking-target vehicle in active passing, in method of tracking the position of a vehicle in a rear-cross blind spot using an ultrasonic sensor according to the present disclosure.

FIG. 9 is a view showing the concept of tracking the position of a tracking-target vehicle in active passing, in a method of tracking the position of a vehicle in a rear-cross blind spot using an ultrasonic sensor according to the present disclosure.

Referring to FIG. 9, in active passing, the tracking-target vehicle 200 is positioned in the front area, and thus a driver can recognize the approach of the tracking-target vehicle 200 through the front visual field. If the subject vehicle 100 is a self-driving vehicle, it may be possible to sense the tracking-target vehicle 200 through a front radar sensor.

In this active passing, the tracking-target vehicle 200 enters a rear blind spot through a side area from the front area. Accordingly, it is required to determine the point of time at which the tracking-target vehicle 200 enters the rear blind spot, particularly, the dangerous area 160.

To this end, the subject vehicle 100 detects the position of the tracking-target vehicle 200 approaching from the front area through the front ultrasonic sensor 120 and the rear ultrasonic sensor 130. The position of the tracking-target vehicle 200 may include a horizontal position with respect to the subject vehicle 100 and the position in the up-down movement direction of the tracking-target vehicle 200. Similar to the passive passing, in order to precisely determine a case such as approach or contact of the tracking-target vehicle 200 and the subject vehicle 100, it is required to accurately detect not only the horizontal position, but also the up-down position of the tracking-target vehicle 200.

The distance to the tracking-target vehicle 200 detected by the front ultrasonic sensor 120 and the rear ultrasonic sensor 130 has a characteristic that depends on how close the tracking-target vehicle 200 approaches the subject vehicle 100. In this process, it may be possible to inform a driver of a danger of collision using a sound or through an image when the tracking-target vehicle 200 enters a dangerous area 160 by detecting the position of the tracking-target vehicle 200 through the front ultrasonic sensor 120 and the rear ultrasonic sensor 130. Thereafter, it is effective to determine whether the tracking-target vehicle 200 exits the dangerous area 160 through the rear-cross radar sensor 110 after the tracking-target vehicle 200 enter the dangerous area 160.

Consequently, in active passing, it is possible to determine whether the tracking-target vehicle 200 has entered the dangerous area 160 using the ultrasonic sensors 120 and 130 and determine whether the tracking-target vehicle 200 has exited the dangerous area 160 after passing, using the rear radar sensor 110.

FIGS. 10 to 13 are views showing a process of determining whether a tracking-target vehicle enters a dangerous area on the basis of the position of the tracking-target vehicle in active passing, in the method of tracking the position of a vehicle in a rear-cross blind spot using an ultrasonic sensor according to the present disclosure.

Figure 10:
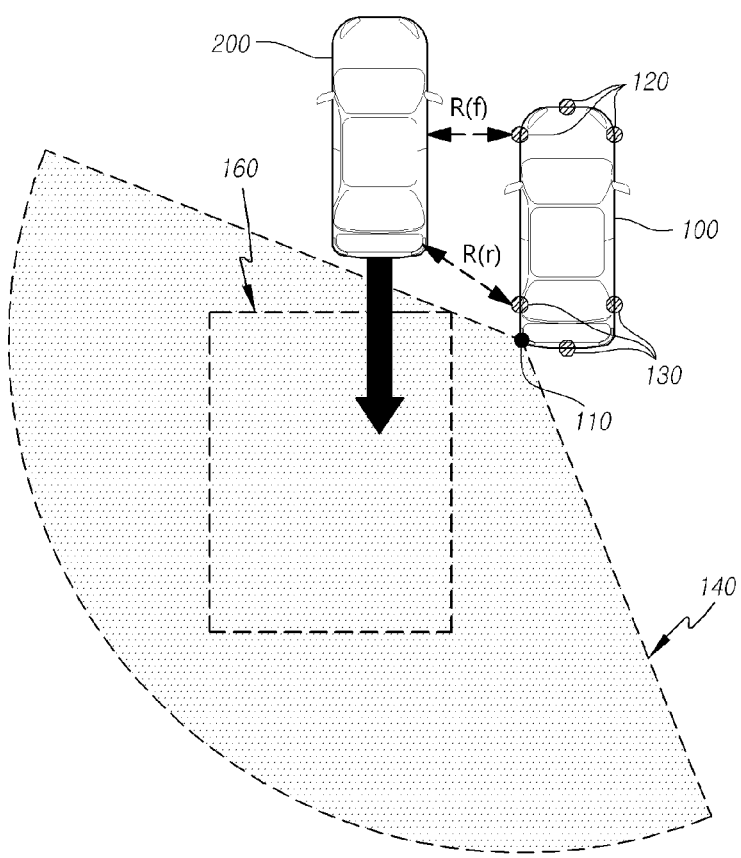
FIGS. 10 to 13 are views showing a process of determining whether a tracking-target vehicle enters a dangerous area on the basis of the position of the tracking-target vehicle in active passing, in the method of tracking the position of a vehicle in a rear-cross blind spot using an ultrasonic sensor according to the present disclosure.

Referring to FIG. 10 first, the tracking-target vehicle 200 will approach the subject vehicle 100 from the front area and will be positioned in the left front area of the subject vehicle 100. So, the tracking-target vehicle 200 is positioned in the visual field of the driver and the driver can safely drive using his/her eyesight. However, in order to find out the point of time at which the tracking-target vehicle 200 enters the rear dangerous area 160, the position of the tracking-target vehicle 200 is tracked by the front ultrasonic sensor 120 and the rear ultrasonic sensor 130.

When the tracking-target vehicle 200 comes close to the subject vehicle 100, the distance to the tracking-target vehicle 200 is measured first by the front ultrasonic sensor 120 of the subject vehicle 100 and then the rear ultrasonic sensor 130 operates and measures the distance to the tracking-target vehicle 200. In this process, the measured distance R(f) to the tracking-target vehicle 200 by the front ultrasonic sensor 120 will gradually decrease, as the tracking-target vehicle 200 approaches the subject vehicle 100.

When the tracking-target vehicle 200 keeps approaching the subject vehicle 100 and the rear bumper of the tracking-target vehicle 200 is positioned in the same horizontal line as the front bumper of the subject vehicle 100, the sides of the tracking-target vehicle 200 will be parallel to the sides of the subject vehicle 100 and the distance R(f) to the tracking-target vehicle 200 measured by the front ultrasonic sensor 120 will be the minimum. In this state, the rear ultrasonic sensor 130 of the subject vehicle 100 is positioned diagonally from the tracking-target vehicle 200, so the measured distance R(r) to the tracking-target vehicle 200 measured by the rear ultrasonic sensor 130 is not the minimum.

Figure 11:
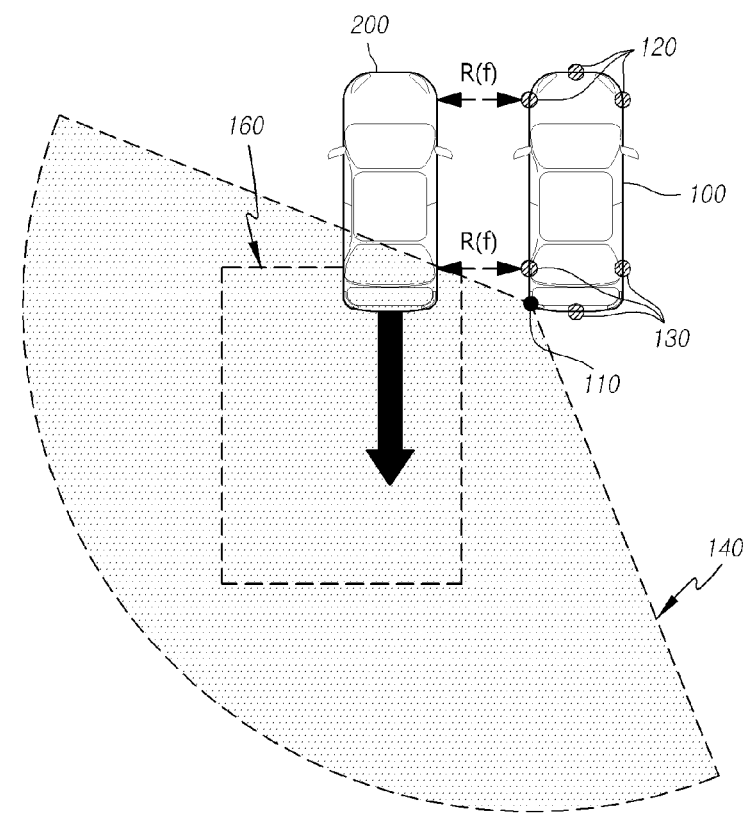

Thereafter, when the subject vehicle 100 moves alongside the tracking-target vehicle 200 at a higher speed than the tracking-target vehicle 200, as shown in FIG. 11, the subject vehicle 100 passes the tracking-target vehicle 200 in parallel with the tracking-target vehicle 200 in the vertical direction.

In this process, the front ultrasonic sensor 120 of the subject vehicle 100 measures the distance to a side of the tracking-target vehicle 200, so the measured distance R(f) to the tracking-target vehicle 200 by the front ultrasonic sensor 120 will be maintained at a constant level until the front bumper of the tracking-target vehicle 200 passes by the front ultrasonic sensor 120. Obviously, the measured distance R(f) to the tracking-target vehicle 200 by the front ultrasonic sensor 120 may be slightly changed by curves on the side or left-right movement of the tracking-target vehicle 200, but the changes may be limited within a predetermined range.

Meanwhile, as the subject vehicle 100 passes the tracking-target vehicle 200, the measured distance R(r) to the tracking-target vehicle 200 by the rear ultrasonic sensor 130 will gradually decrease.

Accordingly, in the period where the measured distance R(r) to the tracking-target vehicle 200 by the rear ultrasonic sensor 130 decreases with the measured distance R(f) to the tracking-target vehicle 200 by the front ultrasonic sensor 120 maintained at a constant level, it is possible to determine that the subject vehicle 100 is passing the tracking-target vehicle 200 along a side of the tracking-target vehicle 200.

Figure 12:
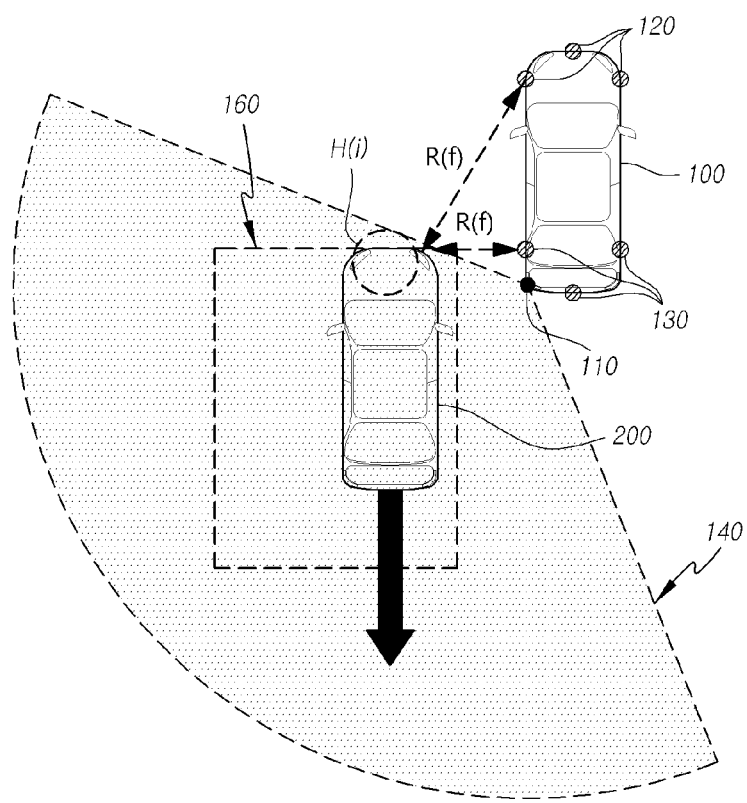

FIG. 12 shows the case in which the front bumper of the subject vehicle 100 passes the front bumper of the tracking-target vehicle 200. In this case, unlike the case of FIG. 11, the measured distance R(r) to the tracking-target vehicle 200 by the rear ultrasonic sensor 130 is maintained at a constant level until the front bumper of the tracking-target vehicle 200 passes by the rear ultrasonic sensor 130. On the contrary, as the subject vehicle 100 passes the tracking-target vehicle 200, the measured distance R(f) to the tracking-target vehicle 200 by the front ultrasonic sensor 120 will gradually increase.

When the tracking-target vehicle 200 enters the dangerous area 160 behind the subject vehicle 100, the driver is informed that the tracking-target vehicle 200 has entered the dangerous area 160 through a sound or an image. Whether the tracking-target vehicle 200 has entered the dangerous area 160 by active passing of the subject vehicle 100 may be determined on the basis of various references, but it is preferable to determine the case in which the front bumper of the tracking-target vehicle 200 enters a reference position as the point of time H(i) of entering the dangerous area 160. In active passing, the reference position for determining whether the front bumper of the tracking-target vehicle 200 has entered the dangerous area 160 may be the frontmost horizontal line of the dangerous area 160.

Figure 13:
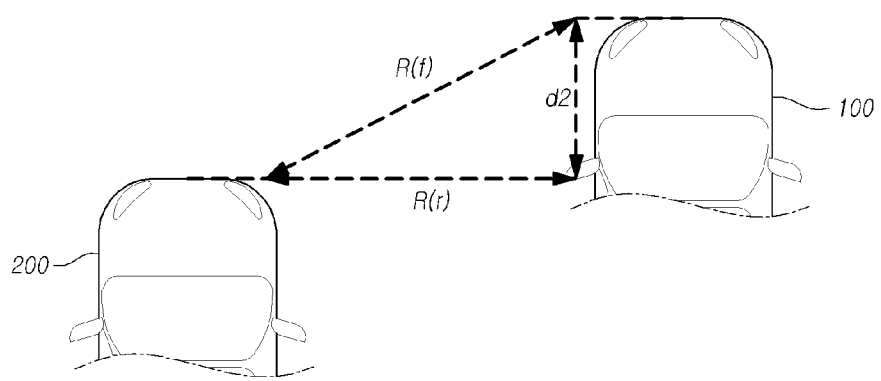

The horizontal position of the front bumper of the tracking-target vehicle 200 can be calculated, as in FIG. 13. That is, the measured distance R(r) to the tracking-target vehicle 200 by the rear ultrasonic sensor 130 is the horizontal distance between the tracking-target vehicle 200 and the subject vehicle 100 and the measured distance R(f) to the tracking-target vehicle 200 by the front ultrasonic sensor 120 is the diagonal distance between the front bumper of the tracking-target vehicle 200 to the front bumper of the subject vehicle 100. Therefore, it is possible to calculate the vertical distance d2 between the front bumper of the tracking-target vehicle 200 and the front bumper of the subject vehicle 100 using the Pythagorean theorem. Therefore, it may be possible to determine that the point of time at which the front bumper of the subject vehicle 100 passes the front bumper of the tracking-target vehicle 200 over a reference distance, that is, the point of time at which the front bumper of the tracking-target vehicle 200 passes the frontmost horizontal line of the dangerous area 160 as the point of time H(i) of entering the dangerous area 160.

Figure 14:
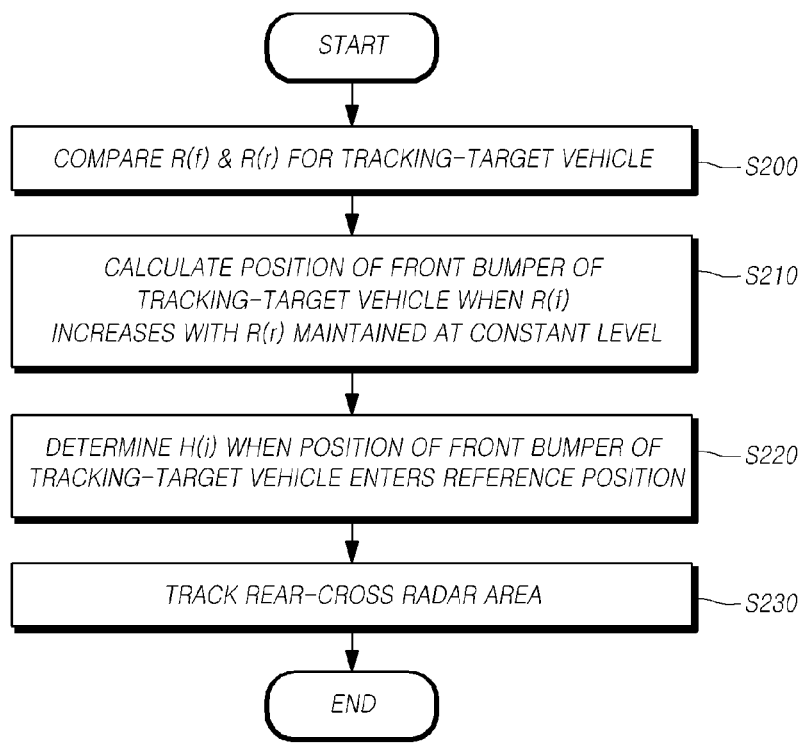
FIG. 14 is a flowchart showing the process of determining whether a tracking-target vehicle exits a dangerous area on the basis of the position of the tracking-target vehicle in active passing, in the method of tracking the position of a vehicle in a rear-cross blind spot using an ultrasonic sensor according to the present disclosure.

FIG. 14 is a flowchart showing the process of determining whether a tracking-target vehicle exits a dangerous area on the basis of the position of the tracking-target vehicle in active passing, in the method of tracking the position of a vehicle in a rear-cross blind spot using an ultrasonic sensor according to the present disclosure.

Referring to FIG. 14, the process of determining whether a tracking-target vehicle enters a dangerous area on the basis of the position of the tracking-target vehicle in active passing may include: comparing the measured distance R(f) to the tracking-target vehicle 200 by the front ultrasonic sensor 120 and the measured distance R(r) to the tracking-target vehicle 200 by the rear ultrasonic sensor 130 (s200); calculating the position of the front bumper of the tracking-target vehicle 200 when the measured distance R(f) to the tracking-target vehicle 200 by the front ultrasonic sensor 120 increases with the measured distance R(r) to the tracking-target vehicle 200 by the rear ultrasonic sensor 130 maintained at a constant level (S210); determining that it is the point of time H(i) of entering the dangerous area 160 when the front bumper of the tracking-target vehicle 200 enters the reference position (S220); and tracking a rear-cross radar area (S230). As described above, the reference position may be the frontmost horizontal line of the dangerous area 160.

The comparing of the measured distance R(f) to the tracking-target vehicle 200 by the front ultrasonic sensor 120 and the measured distance R(r) to the tracking-target vehicle 200 by the rear ultrasonic sensor 130 (S200) is a process of detecting the position of the tracking-target vehicle 200 through the front ultrasonic sensor 120 and the rear ultrasonic sensor 130 and then determining whether the subject vehicle 100 passes the tracking-target vehicle 200 on the basis of the measured distance R(f) to the tracking-target vehicle 200 by the front ultrasonic sensor 120 and the measured distance R(r) to the tracking-target vehicle 200 by the rear ultrasonic sensor 130. That is, when the tracking-target vehicle 200 approaches from the front area, both of the measured distance R(f) to the tracking-target vehicle 200 by the front ultrasonic sensor 120 and the measured distance R(r) to the tracking-target vehicle 200 by the rear ultrasonic sensor 130 will decrease. However, when the subject target 100 is close to a side of the tracking-target vehicle 200, the measured distance R(f) to the tracking-target vehicle 200 by the front ultrasonic sensor 120 will be maintained at a constant level and the measured distance R(r) to the tracking-target vehicle 200 by the rear ultrasonic sensor 130 will decrease.

On the contrary, when the front bumper of the subject vehicle 100 passes the front bumper of the tracking-target vehicle 200, the measured distance R(r) to the tracking-target vehicle 200 by the rear ultrasonic sensor 130 will be maintained at a constant level and the measured distance R(f) to the tracking-target vehicle 200 by the front ultrasonic sensor 120 will increase. In this case, it is possible to determine whether the tracking-target vehicle 200 enters the dangerous area 160 on the basis of the position of the front bumper of the tracking-target vehicle 200.

Accordingly, when the measured distance R(r) to the tracking-target vehicle 200 by the rear ultrasonic sensor 130 is maintained at a constant level and the measured distance R(f) to the tracking-target vehicle 200 by the front ultrasonic sensor 120 increases, the calculating of the position of the front bumper of the tracking-target vehicle 200 (S210) can calculate a vertical distance as the distance between the front bumper of the tracking-target vehicle 200 and the front bumper of the subject vehicle 100 under the assumption that the measured distance R(r) to the tracking-target vehicle 200 by the rear ultrasonic sensor 130 is a horizontal distance and the measured distance R(f) to the tracking-target vehicle 200 by the front ultrasonic sensor 120 is a diagonal distance.

As a result, when the position of the front bumper of the tracking-target vehicle 200 enters the reference position, that is, the frontmost horizontal line of the dangerous area 160, it is possible to determine that the tracking-target vehicle 200 has entered the dangerous area 160 through the determining of that it is the point of time H(i) of entering the dangerous area 160 (S220).

The tracking of a rear-cross radar area (S100) is a process of tracking the tracking-target vehicle 200 that has entered the dangerous area 160, through the radar sensor 110 on the left or right rear side of the subject vehicle 100.

Figure 15:
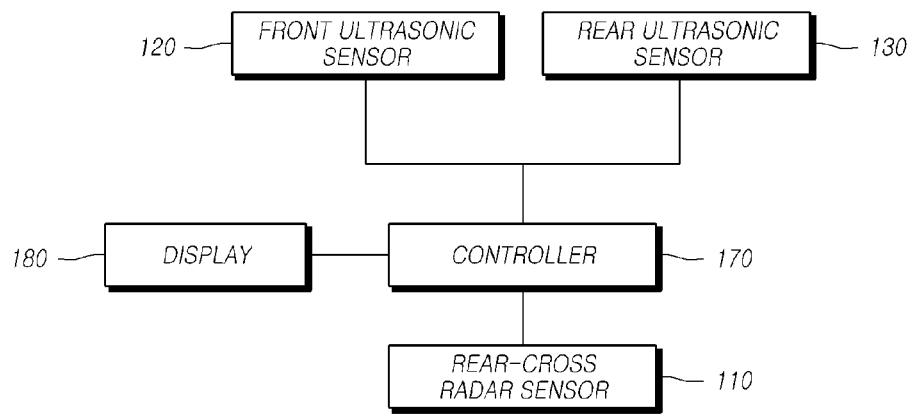
FIG. 15 is a view showing the configuration of a system for tracking the position of a vehicle in a rear-cross blind spot using an ultrasonic sensor according to an embodiment.

FIG. 15 is a view showing the configuration of a system for tracking the position of a vehicle in a rear-cross blind spot using an ultrasonic sensor according to an embodiment.

Referring to FIG. 15, the system for tracking the position of a vehicle in a rear-cross blind spot using an ultrasonic sensor according to an embodiment may include a rear-cross radar sensor 110, a front ultrasonic sensor 120, a rear ultrasonic sensor 130, a controller 170, and a display 180.

The rear-cross radar sensor 110 is a device that senses obstacles behind a vehicle, and radar sensors such as an NXP sensor based on an RF CMOS technology, Hella, or InnoSenT may be used.

The front ultrasonic sensor 120 and the rear ultrasonic sensor 130 are sensors that sense objects positioned ahead of or behind the subject vehicle 100 using ultrasonic waves of over about 20 KHz. Ultrasonic sensors have high frequencies and large wavelengths, so they can precisely measure the distance to the tracking-object vehicle 200 and can be made of a magnetic-deformable material such as ferrite or a voltage- or electricity-deformable material.

The controller 170 is disposed in the subject vehicle 100, determines the position of the tracking-target vehicle 200, and gives a warning through a sound or an image using the display 180 when the tracking-target vehicle 200 enters the dangerous areas 150 and 160. The controller 170 may include an Arithmetic Logic Unit (ALU) for calculation, a resister for temporarily storing data and instructions, and a controller. For example, the controller 170 may be a processor having various architectures such as Alpha by Digital, MIPS by MIPS technology, NEC, IDT, and Siemens, x86 by companies including Intel, Cyrix, A M D, and Nexgen, and PowerPC by IBM and Motorola.

The display 180 may include not only a device that can display characters and images such as an LED, an LCD, and e-ink, but a transducer such as a speaker. Accordingly, when the tracking-target vehicle 200 enters or exits the dangerous areas 150 and 160, it is possible to inform a driver of this situation through the display 180, using a sound or an image.

Although it was exemplified above to use radar sensors to detect the position of a tracking-target vehicle in a rear-cross blind spot from a driver, the present disclosure can be applied in the same way to the case that detects the position of a tracking-target vehicle using a lidar or a camera other than radar sensors.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. That is, a combination of one or more elements selected from all the elements may operate without departing from the scope of the present disclosure. The scope of the present disclosure shall be construed on the basis of the accompanying claims in such a manner that all of the technical ideas included within the scope equivalent to the claims belong to the present disclosure.

What is claimed is:

1. A system for tracking a tracking-target vehicle, comprising:
a rear-cross sensor disposed on a rear portion of a subject vehicle and composed of at least one of a radar, a lidar, or a camera;
a front ultrasonic sensor disposed on a front portion of the subject vehicle;
a rear ultrasonic sensor disposed on the rear portion of the subject vehicle; and
a controller comprising at least one processor,
wherein
the controller is configured to set a range of a dangerous area of a rear-cross blind spot of the subject vehicle differently for (i) passive passing in which the tracking-target vehicle passes the subject vehicle and (ii) active passing in which the subject vehicle passes the tracking-target vehicle, and
the controller is configured to
compare a measured distance to the tracking-target vehicle by the front ultrasonic sensor and a measured distance to the tracking-target vehicle by the rear ultrasonic sensor, and
determine whether the tracking-target device enters or exits the dangerous area for each of the passive passing and active passing, using a result of the comparing.

2. The system of claim 1, further comprising:
a display configured to display information about entry or exit to a driver when the tracking-target vehicle enters or exits the dangerous area as the result of determining by the controller.

3. The system of claim 2, wherein the dangerous area is set further forward in the passive passing than in the active passing.

4. The system of claim 1, wherein the controller configured to
track the tracking-target vehicle in a rear-cross sensor area using the rear-cross sensor; and
calculate a position of a specific portion of the tracking-target vehicle while the measured distance to the tracking-target vehicle by the rear ultrasonic sensor increases with the measured distance to the tracking-target vehicle by the front ultrasonic sensor maintained at a constant level, and wherein whether the tracking-target vehicle exits the dangerous area is determined on the basis of whether the position of the specific portion of the tracking-target vehicle exits a reference position.

5. A method of tracking a position of a tracking-target vehicle from a subject vehicle comprising a rear-cross radar sensor, which is composed of at least one of a radar, a lidar, or a camera, a front ultrasonic sensor, and a rear ultrasonic sensor, the method comprising:
- comparing a measured distance to the tracking-target vehicle by the front ultrasonic sensor and a measured distance to the tracking-target vehicle by the rear ultrasonic sensor; and
- determining whether the tracking-target vehicle enters or exits a dangerous area in a rear-cross blind spot of the subject vehicle using a result of the comparing,
- wherein
- a range of the dangerous area is set differently for (i) passive passing in which the tracking-target vehicle passes the subject vehicle and (ii) active passing in which the subject vehicle passes the tracking-target vehicle, and
- whether the tracking-target vehicle enters or exits the range of the dangerous area is determined for each of the passive passing and the active passing.

6. The method of claim 5, wherein the dangerous area is set further forward in the passive passing than in the active passing.

7. The method of claim 5, wherein further comprising, in the passive passing:
- tracking the tracking-target vehicle in a rear-cross sensor area using the rear-cross sensor; and
- calculating a position of a specific portion of the tracking-target vehicle while the measured distance to the tracking-target vehicle by the rear ultrasonic sensor increases with the measured distance to the tracking-target vehicle by the front ultrasonic sensor maintained at a constant level,
- wherein whether the tracking-target vehicle exits the dangerous area is determined on the basis of whether the position of the specific portion of the tracking-target vehicle exits a reference position.

8. The method of claim 7, wherein the specific portion of the tracking-target vehicle is a rear bumper.

9. The method of claim 7, wherein the reference position is a frontmost horizontal line of the dangerous area.

10. The method of claim 5, further comprising, in the active passing:
- calculating a position of a specific portion of the tracking-target vehicle while the measured distance to the tracking-target vehicle by the front ultrasonic sensor increases with the measured distance to the tracking-target vehicle by the rear ultrasonic sensor maintained at a constant level as a result of comparing the measured distance to the tracking-target vehicle by the front ultrasonic sensor and the measured distance to the tracking-target vehicle by the rear ultrasonic sensor;
- determining that the tracking-target vehicle has entered the dangerous area when the specific portion of the tracking-target vehicle enters a reference position; and
- tracking the tracking-target vehicle in a rear-cross sensor area using the rear-cross sensor.

11. The method of claim 10, wherein the specific portion of the tracking-target vehicle is a front bumper.

12. The method of claim 10, wherein the reference position is a frontmost horizontal line of the dangerous area.

13. The method of claim 5, further comprising, displaying information about entry or exit to a driver when the tracking-target vehicle enters or exits the dangerous area.

14. A method of tracking a position of a tracking-target vehicle from a subject vehicle comprising a rear-cross radar sensor, which is composed of at least one of a radar, a lidar, or a camera, a front ultrasonic sensor, and a rear ultrasonic sensor in passive passing in which the tracking-target vehicle passes the subject vehicle, the method comprising:
- tracking the tracking-target vehicle in a rear-cross sensor area using the rear-cross sensor;
- comparing a measured distance to the tracking-target vehicle by the front ultrasonic sensor and a measured distance to the tracking-target vehicle by the rear ultrasonic sensor;
- calculating a position of a specific portion of the tracking-target vehicle while the measured distance to the tracking-target vehicle by the rear ultrasonic sensor increases with the measured distance to the tracking-target vehicle by the front ultrasonic sensor maintained at a constant level; and
- determining whether the tracking-target vehicle exits a dangerous area in a rear-cross blind spot of the subject vehicle,
- wherein whether the tracking-target vehicle exits the dangerous area is determined on the basis of whether the position of the specific portion of the tracking-target vehicle exits a reference position.

15. The method of claim 14, wherein the specific portion of the tracking-target vehicle is a rear bumper.

16. The method of claim 14, wherein the reference position is a frontmost horizontal line of the dangerous area.

17. A method of tracking a position of a tracking-target vehicle from a subject vehicle comprising a rear-cross radar sensor, which is composed of at least one of a radar, a lidar, or a camera, a front ultrasonic sensor, and a rear ultrasonic sensor in active passing in which the subject vehicle passes the tracking-target vehicle, the method comprising:
- comparing a measured distance to the tracking-target vehicle by the front ultrasonic sensor and a measured distance to the tracking-target vehicle by the rear ultrasonic sensor;
- calculating the position of a specific portion of the tracking-target vehicle while the measured distance to the tracking-target vehicle by the front ultrasonic sensor increases with the measured distance to the tracking-target vehicle by the rear ultrasonic sensor maintained at a constant level as a result of comparing the measured distance to the tracking-target vehicle by the front ultrasonic sensor and the measured distance to the tracking-target vehicle by the rear ultrasonic sensor;
- determining that the tracking-target vehicle enters the dangerous area when the position of the specific portion of the tracking-target vehicle enters a reference position; and
- tracking the tracking-target vehicle in a rear-cross sensor area using the rear-cross sensor.

18. The method of claim 17, wherein the specific portion of the tracking-target vehicle is a front bumper, and
- wherein the reference position is a frontmost horizontal line of the dangerous area.

* * * * *